United States Patent
Wierzba et al.

[11] Patent Number: 5,941,133
[45] Date of Patent: *Aug. 24, 1999

[54] TORSIONAL AND TRANSLATIONAL VIBRATION REMOVING DEVICE

[75] Inventors: Paul Wierzba; Randy W. Perusse, both of Calgary, Canada

[73] Assignee: ETI Technologies Inc., St. Peter Port, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/634,721

[22] Filed: Apr. 19, 1996

[51] Int. Cl.⁶ ..................................... F16F 15/22
[52] U.S. Cl. ..................... 74/573 F; 74/572; 74/573 R; 74/574
[58] Field of Search ....................... 74/572–574

[56] References Cited

U.S. PATENT DOCUMENTS

| | | | |
|---|---|---|---|
| 3,282,127 | 11/1966 | Deakin | 74/573 R |
| 3,410,154 | 11/1968 | Deakin | 74/573 R |
| 3,462,136 | 8/1969 | Rumsey | 74/573 F |
| 3,577,802 | 5/1971 | Rumsey . | |
| 3,653,278 | 4/1972 | Brinkman . | |
| 3,670,593 | 6/1972 | Troyer . | |
| 3,707,031 | 12/1972 | Hall . | |
| 3,799,619 | 3/1974 | LaBarber | 74/573 R |
| 3,823,619 | 7/1974 | Shotwell . | |
| 3,945,269 | 3/1976 | Bremer, Jr. . | |
| 3,992,963 | 11/1976 | Khanna . | |
| 4,044,627 | 8/1977 | Zander . | |
| 4,044,638 | 8/1977 | Heffron et al. . | |
| 4,075,909 | 2/1978 | Deakin | 74/573 R |
| 4,150,587 | 4/1979 | Bremer, Jr. . | |
| 4,166,377 | 9/1979 | Szabo et al. . | |
| 4,200,004 | 4/1980 | Bremer, Jr. . | |
| 4,226,139 | 10/1980 | Zilahi-Szabo . | |
| 4,304,107 | 12/1981 | Fall et al. . | |
| 4,368,807 | 1/1983 | McLean et al. . | |
| 4,378,865 | 4/1983 | McLean . | |
| 4,584,901 | 4/1986 | Conseur . | |
| 4,615,237 | 10/1986 | Forkel . | |
| 4,687,087 | 8/1987 | Tebbe . | |
| 4,782,936 | 11/1988 | Bopp . | |
| 4,874,350 | 10/1989 | Casse et al. . | |
| 4,895,047 | 1/1990 | George . | |
| 4,914,949 | 4/1990 | Andrä et al. . | |
| 5,148,719 | 9/1992 | Ampferer et al. . | |
| 5,194,046 | 3/1993 | Jäckel . | |
| 5,433,666 | 7/1995 | Graton et al. . | |
| 5,592,858 | 1/1997 | Taylor | 74/572 |
| 5,605,078 | 2/1997 | Taylor et al. | 74/573 R |
| 5,749,269 | 5/1998 | Szymanski et al. | 74/574 |
| 5,829,319 | 11/1998 | Mokeddem | 74/574 |

FOREIGN PATENT DOCUMENTS

| | | | |
|---|---|---|---|
| 58-37353 | 3/1983 | Japan | 74/573 F |
| 1504998 | 3/1978 | United Kingdom | 74/573 F |

*Primary Examiner*—Vinh T. Luong
*Attorney, Agent, or Firm*—Burns, Doane, Swecker & Mathis, L.L.P.

[57] ABSTRACT

A torsional and translational vibration removing device or balancer includes the combination of at least one annular torsional vibration damping mass and a plurality of translational vibration compensating masses. The annular torsional vibration damping mass can be positioned within an annular groove in a housing so as to be capable of freely rotating during rotation of the balancer. The annular torsional vibration damping mass can also be provided with an annular groove that receives the translational vibration compensating masses. The compensating masses are free to rotate within the annular groove in the torsional vibration damping mass so that during rotation of the balancer, the compensating masses move within the annular groove of the damping mass to assume a position which reduces translational vibration while the torsional vibration damping mass rotates to reduce torsional vibration.

20 Claims, 11 Drawing Sheets

TORSIONAL AND TRANSLATIONAL VIBRATION REMOVING DEVICE

FIELD OF THE INVENTION

The present invention generally relates to balancers and vibration dampers. More particularly, the present invention pertains to a combination torsional and translational vibration removing device that is designed to effect the removal of both torsional vibration and translational vibration.

BACKGROUND OF THE INVENTION

Rotating systems such as rotating shafts oftentimes experience torsional vibration as well as translational vibration. Generally speaking, torsional vibration refers to the vibration which results in oscillatory rotation of the rotating component (e.g., rotating shaft) about its central longitudinal axis. Translational vibration, on the other hand, generally refers to the vibration which results in movement of the rotating component in a direction normal to its central longitudinal axis.

In a wide variety of different systems such as engines for automobiles, jet skis and the like, torsional vibration as well as translational vibration are present. In the case of engines, for example, the torsional vibration and the translational vibration can be attributed to the motion of sliding and rotating masses that constitute various parts of the engine. These masses include pistons, connecting rods, crank throws and the like. In addition to the motion of the sliding and rotating masses, the combustion processes in these cylinders during operation of the engine can contribute to the creation of torsional vibration and translational vibration.

Proposals have been made in the past to employ untuned viscous torsional dampers in an attempt to reduce torsional vibration. FIG. 1 illustrates such an untuned viscous torsional damper in the context of a pulley. The pulley 30 is rotatably driven by a shaft 31 and is provided with a cylindrical cavity that contains a disk-damping mass 32. The space between the inner walls of the cavity in the pulley 30 and the outer surface of the damping mass 32 defines a shear gap, and this shear gap is typically filled with a suitable viscous fluid which is selected to maximize the torsional damping for a specified ratio of the inertia of the pulley 30 versus the inertia of the damping mass 32. The amount of shear damping that occurs in the shear gap between the pulley 30 and the damping mass 32 depends on the size of the space, the viscosity of the fluid and the relative rotational speed between the pulley and the damping mass.

While the untuned viscous damper mentioned above may be capable of offsetting some torsional vibration, it suffers from a variety of disadvantages and drawbacks. In one respect, the untuned viscous damper is not designed to address translational vibration that results from movement of the rotating shaft in a direction normal to the central longitudinal axis of the shaft. As a result, there still exists an out of balance condition in the system which can adversely affect the operation, performance and life of the system.

A need also exists for a device that removes both translational and torsional vibration, yet which is also relatively small and compact in design so that the device can be used in conjunction with existing machines and systems.

SUMMARY OF THE INVENTION

The present invention provides a combination torsional and translational vibration removing device that is specifically adapted to remove both torsional vibration as well as translational vibration in a rotating element such as a shaft. The balancer according to the present invention is able to achieve such results by way of a design that is relatively small and compact in size. Thus, the present invention allows existing machinery and systems to be outfitted in a way that effects the removal of torsional and translational vibration. The balancer according to the present invention can be configured as a device that is adapted to be mounted on the rotating element. Alternatively, if space permits, the rotating element itself can be modified to embody the features of the present invention described below in more detail.

In accordance with one aspect of the present invention, the torsional and translational vibration removing device includes a housing provided with an annular groove that is open along at least one side, a cover secured to the housing to close the one side and define an annular hollow interior that is sealed from the exterior, and means for mounting the housing on a rotatable element. An annular torsional vibration damping mass is positioned within the hollow interior and the torsional vibration damping mass has an outer peripheral surface that is dimensioned smaller than the inner wall surface bounding the hollow interior so that a shear gap exists between the outer peripheral surface of the torsional vibration damping mass and the inner wall surface bounding the hollow interior. The torsional vibration damping mass is provided with at least one annular groove, and a viscous fluid is disposed in the hollow interior. A plurality of translational vibration compensating masses are positioned within the annular groove of the torsional vibration damping mass. The translational vibration compensating masses are freely movable within the annular groove of the torsional vibration damping mass so that during rotation of the torsional and translational vibration removing device the translational vibration compensating masses move within the annular groove of the torsional vibration damping mass to assume a position which reduces translational vibration in the rotatable element while the torsional vibration damping mass rotates in the hollow interior to reduce torsional vibration.

In accordance with another aspect of the present invention, the torsional and translational vibration removing device includes a body having a hollow interior, an annular torsional vibration damping mass positioned within the hollow interior of the body, with the torsional vibration damping mass being provided with at least one annular groove, a viscous liquid in the hollow interior of the body, and a plurality of translational vibration compensating masses disposed in the annular groove of the torsional vibration damping mass and arranged in a single annular row. The plurality of translational vibration compensating masses are freely movable in the annular groove of the torsional vibration damping mass so that during rotation of the body the translational vibration compensating masses move within the annular groove of the torsional vibration damping mass to assume a position which reduces translational vibration while the torsional vibration damping mass rotates in the hollow interior to reduce torsional vibration.

According to another embodiment of the invention, the torsional and translational vibration removing device includes a body having first and second hollow spaces that are separated from one another by a wall portion of the body, an annular torsional vibration damping mass positioned in the first hollow space and a plurality of translational vibration compensating masses positioned in the second hollow space. The first hollow space is dimensioned greater than the torsional vibration damping mass so that shear gaps exists between the outer periphery of the torsional vibration damping mass and the inner wall surface of the body bounding the first hollow space. A viscous liquid is disposed in the first hollow space so that the viscous liquid is located in the shear spaces. The translational vibration compensating masses positioned in the second hollow space are preferably arranged in a single annular row. The plurality of translational vibration compensating masses are freely movable in the second hollow space so that during rotation of the body the translational vibration compensating masses move within the second hollow space to assume a position which reduces translational vibration while the annular torsional vibration damping mass rotates in the first hollow space to reduce torsional vibration.

BRIEF DESCRIPTION OF THE DRAWING FIGURES

DETAILED DESCRIPTION OF THE INVENTION

The present invention provides a balancer or vibration removing device that compensates for both torsional vibration as well as translational vibration in a rotating element such as a shaft or the like. Generally speaking, the balancer or vibration removing device includes at least one torsional vibration damping mass and a plurality of translational compensating masses. The torsional vibration damping mass is preferably in the form of a cylinder, doughnut or annular disk which compensates for or removes torsional vibration which may result from a variety of sources such as the firing of the piston in an internal combustion engine. The torsional vibration damping mass can be made of a variety of materials which provide the desired degree of weight such as metal (e.g., steel, stainless steel, tungsten carbide, etc.) and ceramic material such as silicon nitrate. The translational vibration compensating masses are preferably in the form of balls, cylindrical weights or disk-like weights which compensate for or remove translational vibration which may arise from a variety of sources such as mass imbalance, hydrodynamic imbalance or aerodynamic imbalance caused by, for example, uneven pitch in propellers. The compensating masses are also made of materials which provide the desired degree of weight such as metal (e.g., steel, stainless steel, tungsten carbide, etc.) and ceramic material such as silicon nitrate. Various balancers which embody the foregoing characteristics in accordance with the present invention are described below in more detail.

Figure 2:
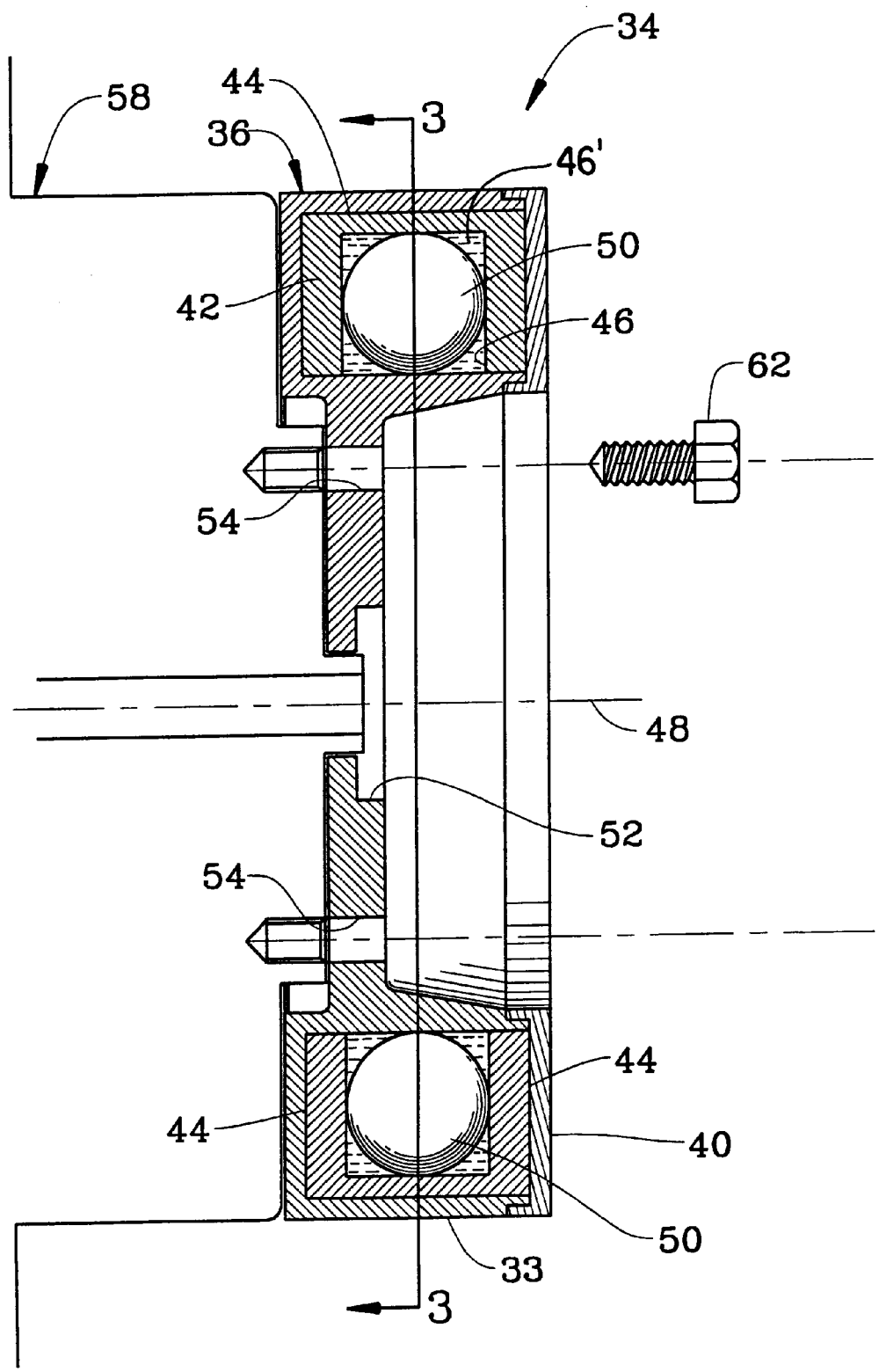
FIG. 2 is a cross-sectional view of a torsional and translational vibration removing device according to one embodiment of the invention taken along the section line 2—2 in FIG. 4 and depicted as being mounted on a magneto.

Referring to FIG. 2, one embodiment of the balancer or torsional and translational vibration removing device 34 according to the present invention consists of a disk-shaped body 36 that is adapted to be mounted on a rotatable element such as a shaft. The disk-shaped body 36 includes a housing 38 that is provided with a continuous annular groove extending around the periphery of the housing. One side of the annular groove opens to the exterior and a cover 40 is secured to the housing 38 to close the open side of the annular groove and thereby define an annularly shaped hollow interior within the body 36 that is sealed from the exterior.

An annular torsional vibration damping mass 42 is positioned within the hollow interior of the body 36. The torsional vibration damping mass 42 has an outer peripheral surface that is dimensioned smaller than the inner wall surface bounding the hollow interior of the body 36 so that shear gaps 44 exist between the outer peripheral surface of the torsional vibration damping mass 42 and the inner wall surface bounding the hollow interior of the body. These shear gaps 44 are more clearly illustrated in the cross-sectional view of FIG. 3. The torsional vibration damping mass 42 is free to rotate within the housing 38 without significant radial movement.

The torsional vibration damping mass 42 is a one-piece disk-shaped element. As illustrated in FIG. 2, the torsional vibration damping mass 42 is provided with a continuous annular groove 46. The annular groove 46 is formed in the side of the torsional vibration damping mass 42 that faces radially inwardly towards the longitudinal rotational axis 48 of the balancer.

A plurality of translational vibration compensating masses 50 are disposed within the annular groove 46 in the damping mass 42. In the embodiment illustrated in FIG. 2, the translational vibration compensating masses 50 are in the form of spherical balls, although it is understood that the translational vibration compensating masses could take other forms, such as cylindrical or disk-weights.

Figure 1:
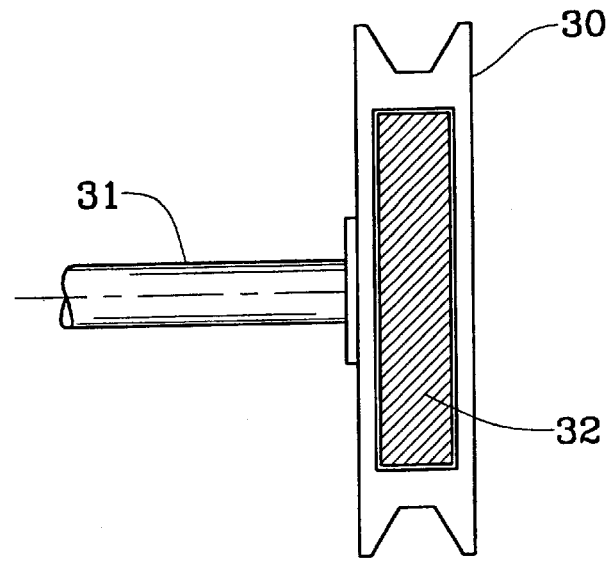
FIG. 1 is a cross-sectional view of a pulley outfitted with an untuned viscous damper.
Figure 3:
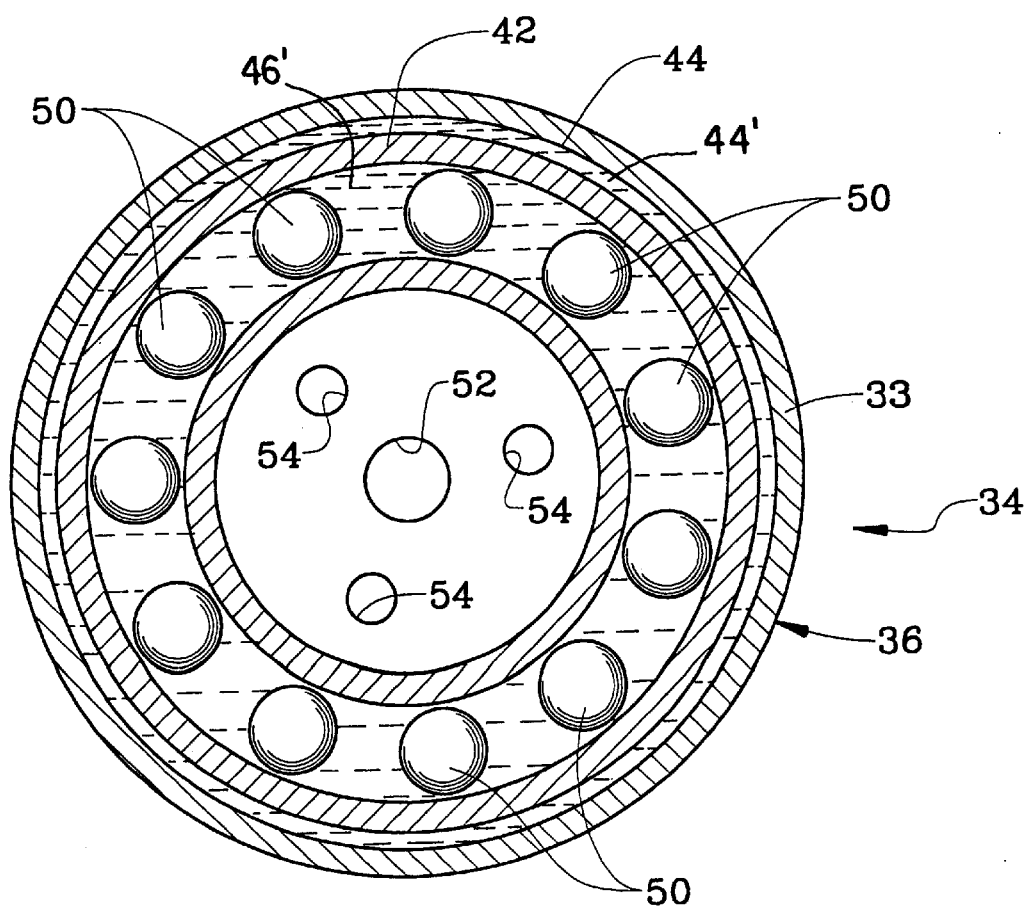
FIG. 3 is a cross-sectional view of the torsional and translational vibration removing device shown in FIG. 2 taken along the section line 3—3 in FIG. 2.

As seen in FIG. 3, the translational vibration compensating masses 50 are arranged in a single annular row. The translational vibration compensating masses 50 are freely moveable within the annular groove 46 formed in the torsional vibration damping mass 42. Each of the translational vibration compensating masses 50 in the annular groove 46 preferably is of the same or substantially the same weight and size. The compensating masses 50 for effecting translational vibration compensation are preferably spherical in shape, although other shapes such as cylindrical or disk-like masses can be employed.

The interior surface of the torsional vibration damping mass 42 that bounds the annular groove 46 is preferably hardened to minimize the rolling resistance of the translational vibration compensating masses 50. It is preferred that the entire annular groove 46 and the shear gaps 44 formed between the outer periphery of the torsional vibration damping mass 42 and the inner wall surface bounding the hollow interior of the body 36 are filled with a viscous fluid 46', 44' as shown in FIGS. 2 and 3, respectively. The viscous fluid provides lubrication and damping for the translational vibration compensating masses 50 and also provides viscous damping in the shear gaps 44.

As illustrated in FIG. 3, the central portion of the body 36 is provided with a central through hole 52 for mounting the balancer on a rotating element such as a shaft. Positioned radially outwardly of the central through hole 52 are several additional through holes 54. These through holes 54 allow the balancer to be secured in place on the rotatable element.

The torsional and translational vibration removing device according to the present invention can be used in almost any situation where a rotating element experiences torsional vibration as well as translational vibration. One context in which the present invention has been found to be particularly useful is that shown in FIG. 4 which illustrates a magneto-crank shaft assembly. The specific details of the magneto-crank shaft assembly are not of particular concern here and so a detailed description of the various features of the assembly is omitted. In general terms, the magneto-crank shaft assembly includes a crank shaft 56, a magneto disk or flywheel 58, a magneto stator 63, and two casing parts 60, 61. The casing part 60 is adapted to be mounted on the engine block and is provided with a through hole through which extends the front end of the crank shaft 56. The magneto stator 63 mounts onto the casing part 60 and is also provided with a through hole through which extends the forward end of the crank shaft 56. The magneto disk or magneto flywheel 58 is operably mounted on the protruding forward end of the crank shaft 56 and extends over the magneto stator 63. The magneto casing part 61 is bolted to the other magneto casing part 60 to cover the magneto assembly.

Figure 4:
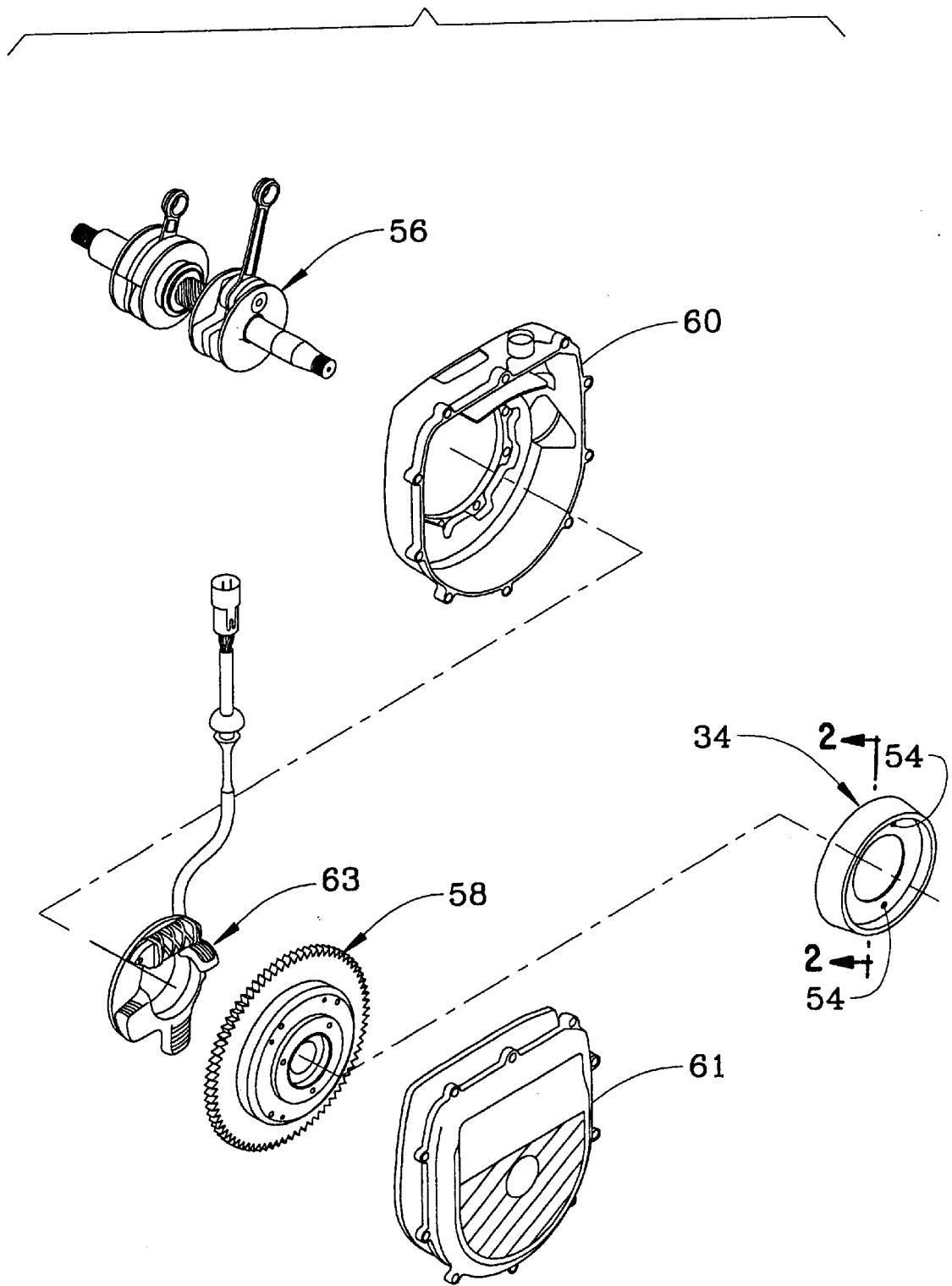
FIG. 4 is an exploded view of a magneto-crank shaft assembly outfitted with a front balancer in accordance with the present invention.

As depicted in FIG. 4, the torsional and translational vibration removing device 34 of the present invention is mounted on the magneto disk (flywheel) 58. The vibration removing device 34 is secured in place on the magneto disk 58 by aligning the through holes 54 on the central portion of the body 36 with corresponding holes on the magneto and then utilizing screws 62 such as illustrated in FIG. 2 to secure the vibration removing device in place. In the arrangement shown in FIG. 4, the torsional and translational vibration removing device 34 functions as a front balancer for the magneto-crank shaft assembly.

Figure 5:
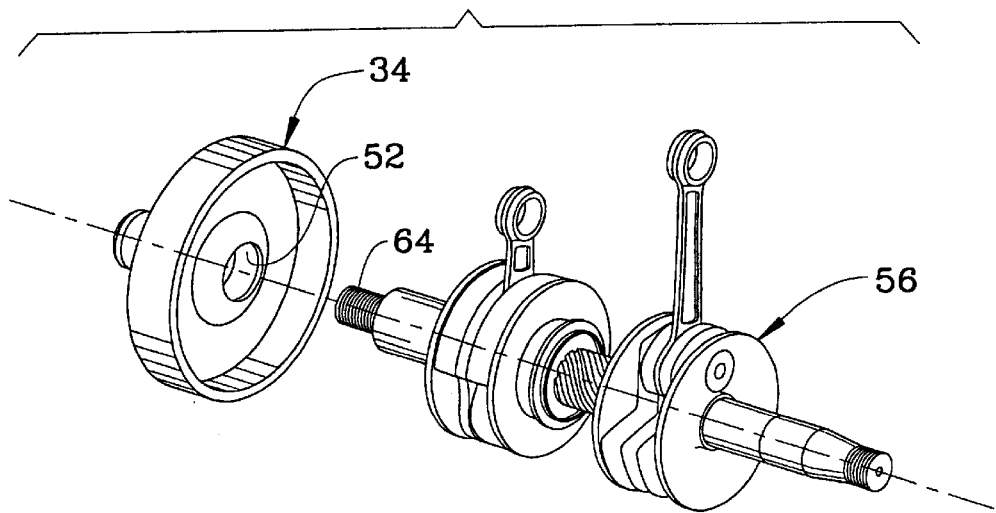
FIG. 5 is an exploded view of a crank shaft assembly outfitted with a rear balancer in accordance with the present invention.

FIG. 5 depicts an alternative usage for the balancer according to the present invention. In FIG. 5, the crank shaft assembly 56 is outfitted with the torsional and translational vibration removing device 34 which functions as a rear balancer. In this arrangement, the centrally located through hole 52 in the central portion of the body 36 can be threaded for threadably receiving the threads 64 on the end of the crank shaft assembly.

Figure 6:
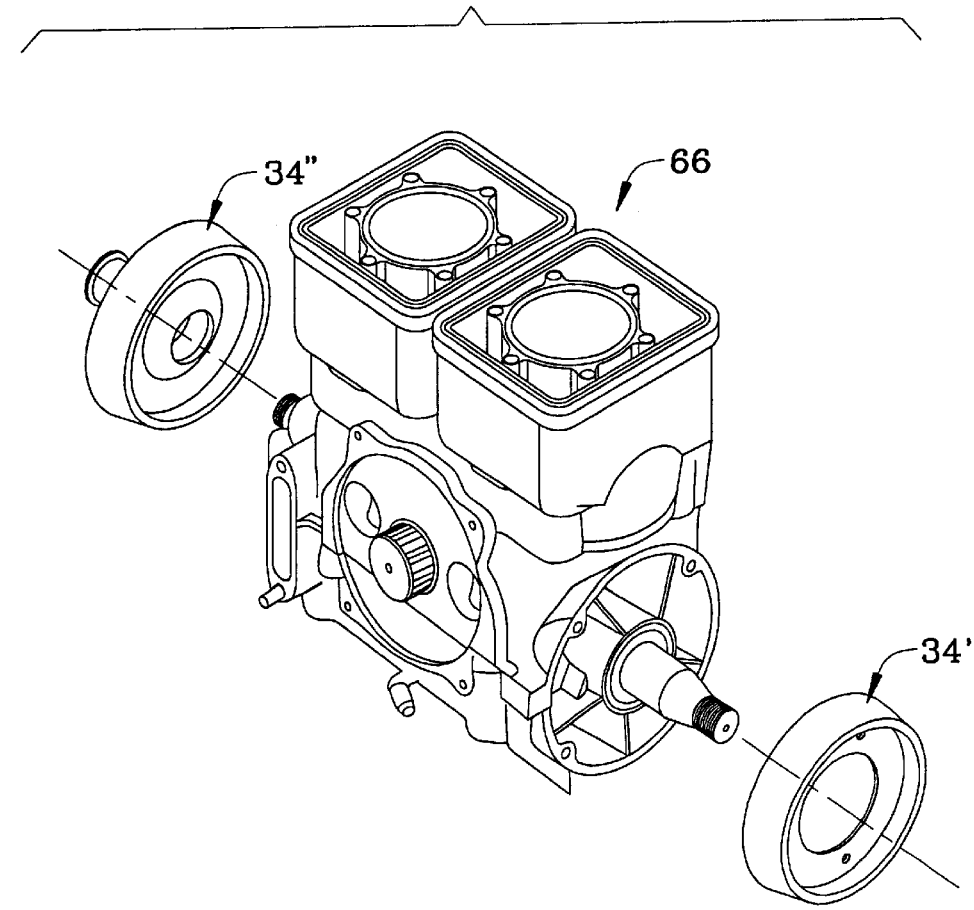
FIG. 6 is a perspective view of a two-cylinder engine outfitted with front and rear balancers in accordance with the present invention.

FIG. 6 depicts a further alternative use for the torsional and translational vibration removing device of the present invention. FIG. 6 illustrates a two-cylinder engine 66 provided with a pair of torsional and translational vibration removing devices 34', 34". One of the torsional and translational vibration removing devices 34' serves as a front balancer that is connected to the magneto while the other torsional and translational vibration removing device 34" serves as a rear balancer that is mounted on the crank shaft.

In operation, the torsional and translational vibration removing device of the present invention is adapted to be rotated through rotation of the rotating element (e.g., magneto or shaft). As the torsional and translational vibration removing device rotates, the translational vibration compensating masses 50 freely move within the annular groove 46 in the torsional vibration damping mass 42 to naturally assume a position which reduces or substantially eliminates translational vibration. At the same time, the annular torsional vibration damping mass freely rotates inside the hollow interior of the body 36 to thereby effect a reduction or substantial elimination of torsional vibration.

It can be seen, therefore, that the present invention provides a mechanism for reducing or substantially eliminating both torsional vibration and translational vibration. Further, the construction of the balancer is rather compact and small in size. This means that the balancer is well suited for use in outfitting existing systems and machinery where space may be limited. In addition, the ability of the balancer to reduce torsional vibration in addition to translational vibration means that torsional vibrations have a much smaller influence on the behavior of the translational vibration compensating masses 50 than would otherwise be the case if the torsional vibration damping mass were not provided. In the arrangement of the present invention described above, the torsional vibration damping mass 42 exhibits a greatly reduced level of torsional vibration than the body 36 which is operatively mounted on the rotating element. Since the annular groove or race 46 which receives the translational vibration compensating masses 50 is built into the torsional vibration damping mass 42, the effect of torsional vibration on the performance of the translational vibration compensating masses 50 is greatly reduced.

Figure 7:
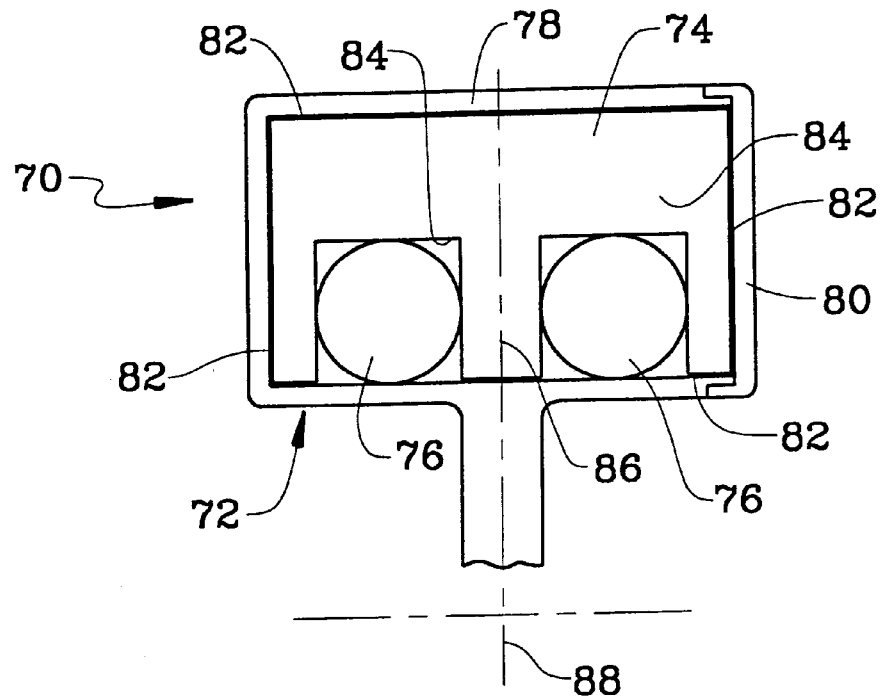
FIG. 7 is a cross-sectional view of a portion of a torsional and translational vibration removing device in accordance with another embodiment of the present invention taken along a section line similar to the section line shown in FIG. 4.

Another embodiment of the present invention is illustrated in FIG. 7. This embodiment of the torsional and translational vibration removing device 70 includes a body 72, a torsional vibration damping mass 74 and the plurality of translational vibration compensating masses 76. It is understood that the illustration in FIG. 7 represents only a portion of the balancer and that the balancer has an overall configuration similar to that illustrated in FIG. 2.

The body 72 includes a housing 78 and a cover 80 secured to one side of the housing 78. The housing 78 is provided with an annular groove that opens to one side of the housing and extends along the annular periphery of the housing. The cover 80 is secured to the housing 78 in an appropriate manner to close the open side of the housing and thereby define a annular hollow interior within the body 72 that is sealed from the exterior. The open side of the housing 78 allows the torsional vibration damping mass 74 and the translational vibration compensating masses 76 to be positioned within the annular groove of the housing 78. Once the torsional vibration damping mass 74 and the translational vibration compensating masses 76 are positioned within the annular groove of the housing 78, the cover 80 is secured to the housing 78.

The torsional vibration damping mass 74 is dimensioned so that the exterior dimensions of the torsional vibration mass 74 are smaller than the dimensions of the inner wall surface bounding the hollow interior within the body 72 to thereby define shear gaps 82 between the exterior surface of the torsional vibration damping mass 74 and the inner wall surface bounding the hollow interior of the body 72. The annular torsional vibration damping mass 74 is provided with two spaced apart annular grooves 84 (i.e. first and second annular grooves) that are separated from one another by a centrally located wall portion 86 of the torsional vibration damping mass 74. The two annular grooves 84 are positioned on opposite sides of the central plane 88 of the balancer and are equidistantly spaced from the central plane 88 of the housing 72. A viscous liquid is provided in the hollow interior of the body 72 to fill the shear gaps 82 as well as the annular grooves 84 in a manner similar to that shown in FIGS. 2 and 3.

Positioned within each of the annular grooves 84 is an annular row of translational vibration compensating masses 76. Although FIG. 7 illustrates only a single translational vibration compensating mass 76 in each of the grooves 84, it is understood that the grooves 84 each contain a single annular row of translational vibration compensating masses arranged in a manner similar to that shown in FIG. 3. Preferably, all of the translational vibration compensating masses 76 in one of the grooves are identical or substantially identical in weight and size while all of the translational vibration compensating masses in the other annular groove are identical or substantially identical in weight and size. Further, the masses in one of the annular grooves 84 are identical or substantially identical in weight to the masses in the other annular groove 84.

Figure 8:
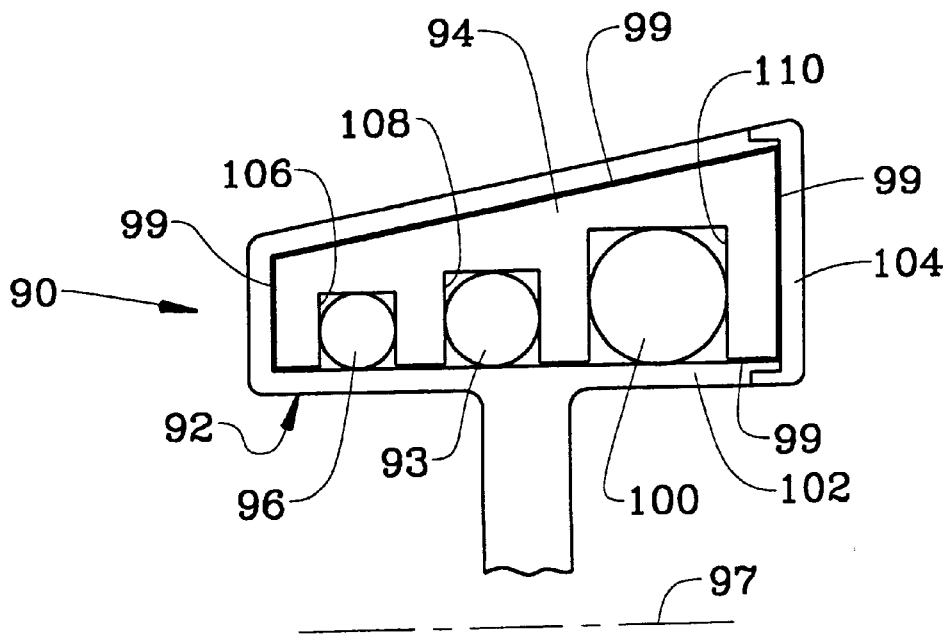
FIG. 8 is a cross-sectional view of a portion of a torsional and translational vibration removing device in accordance with a further embodiment of the present invention taken along a section line similar to the section line shown in FIG. 4.

Another embodiment of the present invention is illustrated in FIG. 8 which depicts a balancer 90 that includes a body 92, an annular torsional vibration damping mass 94 and three sets of translational vibration compensating masses 96, 98, 100. The body 92 consists of a housing 102 having an annular groove. The annular groove in the housing 102 is open at one end to permit the torsional vibration damping mass 94 and the translational vibration compensating masses 96, 98, 100 to be positioned within the housing 102. The annular groove increases in width in the radial direction from one end (i.e., the closed end) towards the opposite end (i.e., the open end). A cover 104 is secured to the housing 102 to close the open end of the annular groove and thereby define an annular hollow interior within the body 92.

As described above in connection with other embodiments, the damping mass 94 is dimensioned to provide shear gaps 99 between the outer periphery of the damping mass 94 and the inner wall surface bounding the hollow interior of the body 92. In addition, the annular damping mass 94 is provided with three annular grooves 106, 108, 110 (i.e., first, second and third annular grooves). The annular grooves 106, 108, 110 are spaced apart from one another in a direction parallel to the rotational axis 97 of the balancer. The annular groove 106 is smaller in width and depth than the intermediately located annular groove 108, and the intermediately located annular groove 108 is smaller in width and depth than the annular groove 110.

The translational vibration compensating masses 96 are arranged in a single annular row similar to that illustrated in FIG. 3. Similarly, the translational vibration compensating masses 98, 100 are arranged within their respective annular grooves in a single annular row similar to that shown in FIG. 3. Each of the masses 96 in the smallest groove 106 possess the same or substantially the same weight and size, each of the masses 98 in the intermediately located annular groove 108 are identical or substantially identical in weight and size, and each of the masses 100 in the annular groove 110 are identical or substantially identical in weight and size. Further, the masses 96 are smaller in weight and size than the masses 98 in the intermediately located annular groove 108, and the masses 98 are smaller in size and weight than the masses 100 in the annular groove 110. As illustrated in FIG. 8, the three annular grooves are spaced apart from one another in a direction parallel to the longitudinal axis about which the balancer rotates.

In the embodiment shown in FIG. 8, a viscous liquid completely fills the annular grooves 106, 108, 110 as well as the shear gaps 99 between the outer surface of the torsional vibration damping mass 94 and the inner wall surface bounding the hollow interior of the body 92 in a manner similar to that shown in FIGS. 2 and 3.

Figure 9:
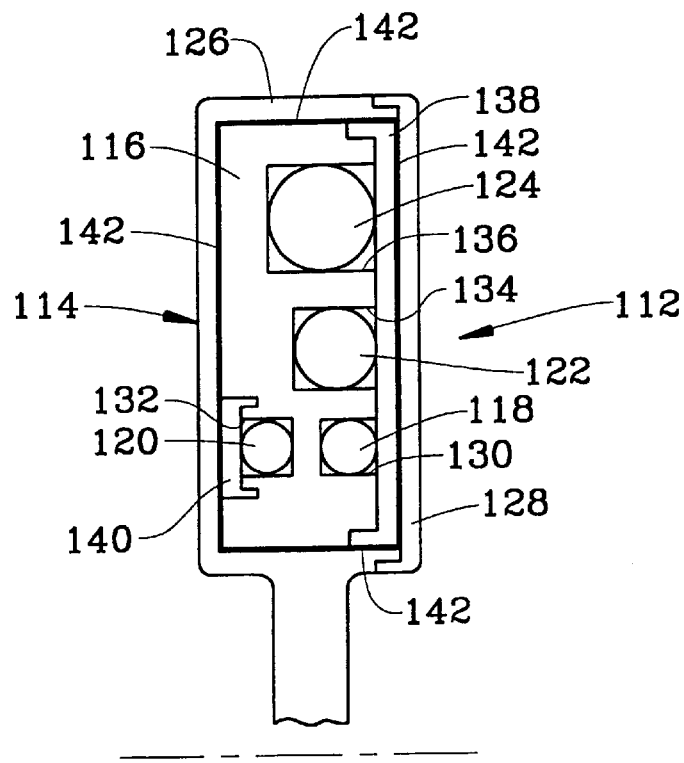
FIG. 9 is a cross-sectional view of a portion of a torsional and translational vibration removing device in accordance with an additional embodiment of the present invention taken along a section line similar to the section line shown in FIG. 4.

In the embodiment of the invention shown in FIG. 9, the torsional and translational vibration removing device or balancer 112 is comprised of a body 114, annular torsional vibration damping mass 116, and four sets of translational vibration compensating masses 118, 120, 122, 124. The body 114 consists of a housing 126 provided with an annular groove that opens to one side of the housing 126, and a cover 128 which closes the open side of the housing 126.

The torsional vibration damping mass 116 is provided with four annular grooves 130, 132, 134, 136 (i.e., first, second, third and fourth annular grooves). The annular grooves 130, 134, 136 open to one side of the torsional vibration damping mass 116 to permit the insertion of the masses 118, 122, 124. A cover 138 is secured to the annular torsional vibration damping mass 116 to close and seal off the annular grooves 130, 134, 136. The annular groove 132 opens to the opposite side of the torsional vibration damping mass 116 and is covered by a cover 140.

The compensating masses 118, 120, 122, 124 are arranged within their respective grooves 130, 132, 134, 136 as a single annular row of masses similar to that illustrated in FIG. 3. As can be seen, the annular grooves 130, 132, 134, 136 each possess a different size. The width and depth of the annular groove 132 is greater than the width and depth of the annular groove 130, the width and depth of the annular groove 134 is greater than the width and depth of the annular groove 132, and the radially outermost annular groove 136 possess a width and depth that is greater than the width and depth of the radially intermediately located annular groove 134.

Each of the compensating masses 118 in the annular groove 134 is preferably of the same or substantially the same weight and size, each of the masses 120 in the annular groove 132 are preferably of the same or substantially the same size and weight, each of the masses 122 in the annular groove 134 possess the same or substantially the same size and weight, and each of the masses in the annular groove 136 preferably possess the same or substantially the same size and weight.

In addition, the size and weight of the compensating masses vary from one groove to the next. As seen in FIG. 9, the masses 118 in the annular groove 130 are smaller in size and weight than the masses 120 in the annular groove 132, the weights 122 in the radially intermediate annular groove 134 are preferably greater in size and weight than the weights 120, and the weights 124 in the radially outermost annular groove 136 are greater in size and weight than the masses 122 in the radially intermediate annular groove 134. As in all of the previously described embodiments, the exterior dimensions of the torsional vibration damping mass 116 are smaller than the internal dimensions of the hollow interior in the body 114 so that shear gaps 142 exist between the outer peripheral surface of the annular torsional vibration damping mass 116 and the inner wall surface bounding the hollow interior of the body 114.

The embodiment illustrated in FIG. 9 provides the advantage of allowing one type of viscous liquid to be placed in the shear gaps 142 and a different viscous liquid to be placed within the annular grooves 130, 132, 134, 136 an illustration of the viscous liquids in the grooves and the shear gaps being similar to that shown in FIGS. 2 and 3. It has been found that in order to improve the speed of response of the translational vibration compensating masses 118, 120, 122, 124, a light lubricating and damping liquid should be employed. In that way, as the balancer begins to rotate, the masses 118, 120, 122, 124 begin to rotate rather quickly. On the other hand, it may be desirable to employ a fluid in the shear gaps 142 having greater viscosity such as silicone oil which has poor lubricating properties.

Figure 10:
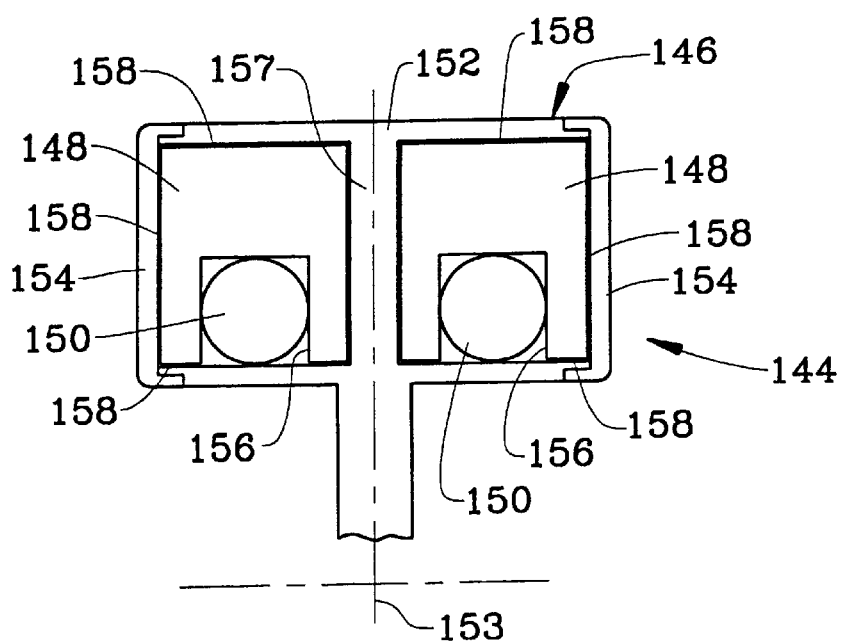
FIG. 10 is a cross-sectional view of a portion of a torsional and translational vibration removing device in accordance with an additional embodiment of the present invention taken along a section line similar to the section line shown in FIG. 4.

The embodiment of the balancer 144 shown in FIG. 10 includes a body 146, a pair of annular torsional vibration damping masses 148, and two sets of translational vibration compensating masses 150. The body 146 consists of a housing 152 that is provided with two spaced apart annular grooves disposed on opposite sides of the central plane 153 of the balancer. Each of the annular grooves is open along one side of the housing 152 and a cover 154 is provided on each side of the housing to close the open sides.

Each of the annular torsional vibration damping masses 148 is provided with a respective first annular groove 156 that opens radially inwardly towards the longitudinal axis of the balancer. Each of the torsional vibration damping masses 148 possess an outer peripheral surface that is dimensioned smaller than the inner wall surface bounding the respective hollow interior chamber so that shear gaps 158 exist between the outer peripheral surface of the torsional vibration damping masses and the respective inner wall surface bounding the hollow interior chamber.

The masses 150 disposed in each of the annular grooves 156 of the respective torsional vibration damping masses 148 are positioned in a single annular row similar to that illustrated in FIG. 3. The compensating masses in one of the annular grooves 156 are each identical or substantially identical in size and weight to one another while the weights in the other annular groove 156 are identical or substantially identical in size and weight. Also, in the embodiment shown in FIG. 10, the masses in one of the annular grooves 156 are identical or substantially identical in size and weight to the masses in the other annular groove 156.

Figure 11:
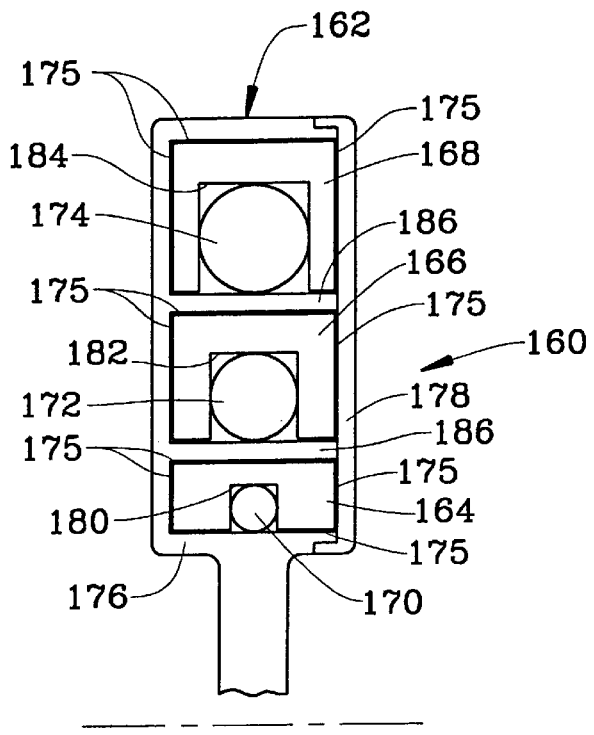
FIG. 11 is a cross-sectional view of a portion of a torsional and translational vibration removing device in accordance with another embodiment of the present invention taken along a section line similar to the section line shown in FIG. 4.

FIG. 11 illustrates an embodiment of the balancer 160 that includes a body 162, three annular torsional vibration damping masses 164, 166, 168, and three sets of translational vibration compensating masses 170, 172, 174. The body 162 consists of a housing 176 provided with three annular grooves that open along one side of the housing 176 to permit insertion of the torsional vibration damping masses 164, 166, 168 and the translational vibration compensating masses 170, 172, 174. A cover 178 is secured to the open side of the housing 176 to enclose the annular grooves and thereby define three hollow interior portions within the body 162. The annular grooves in the housing 176 are separated from one another by wall portions 186.

The three torsional vibration damping masses consist of a radially innermost damping mass 164, a radially intermediate damping mass 166, and a radially outermost damping mass 168. The radially innermost torsional vibration damping mass 164 is provided with a first annular groove 180 that receives the translational vibration compensating masses 170 which are arranged in a single annular row similar to that shown in FIG. 3. Similarly, the radially intermediate torsional vibration damping mass 166 is provided with a first annular groove 182 in which are disposed the compensating masses 172, and the radially outermost damping mass 168 is provided with a first annular groove 184 that receives the compensating masses 174. The compensating masses 172, 174 are also arranged in a single annular row in a manner similar to that depicted in FIG. 3. Each of the annular torsional vibration damping masses 164, 166, 168 is dimensioned to define respective shear gaps 175 between the outer surface of the respective damping mass 164, 166, 168 and the inner wall surface bounding the respective hollow interior portion of the body 162.

All of the compensating masses 170 in the annular groove 180 possess the same or substantially the same size and weight, all of the compensating masses 172 in the annular groove 182 are identical or substantially identical in size and weight, and all of the compensating masses 174 in the annular groove 184 possess the same or substantially the same size and weight. The compensating masses 170 positioned in the annular groove 180 of the radially innermost damping mass 164 are smaller in size and weight than the compensating masses 172 in the annular groove 182 of the radially intermediate damping mass 166. Similarly, the compensating masses 172 in the annular groove 182 of the radially intermediate damping mass 166 are smaller in size and weight than the compensating masses 174 in the annular groove 184 of the radially outermost damping mass 168.

Figure 12:
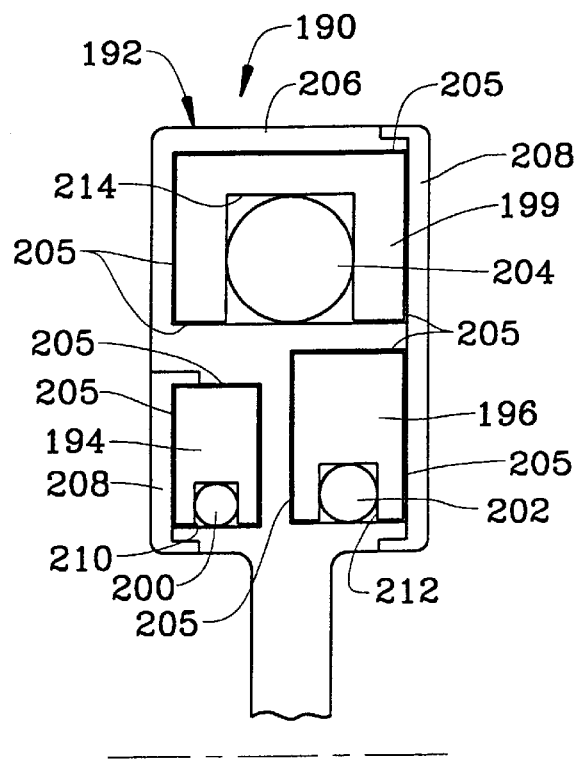
FIG. 12 is a cross-sectional view of a portion of a torsional and translational vibration removing device in accordance with a further embodiment of the present invention taken along a section line similar to the section line shown in FIG. 4.

The embodiment of the balancer 190 shown in FIG. 12 is similar to the embodiment shown in FIG. 11 in that it includes a body 192, three annular torsional vibration damping masses 194, 196, 198, and three sets of the translational vibration compensating masses 200, 202, 204. The body 192 is defined by a housing 206 that is provided with three annular grooves which each receive one of the annular damping masses 194, 196, 198. The grooves in the housing 206 that receive the damping masses 196, 198 open to one side of the housing while the groove in the housing 206 that receives the damping mass 194 opens to the opposite of the housing 206. The housing 206 is provided with covers 208 for retaining the damping masses 194, 196, 198 within respective hollow interior portions of the housing 206.

As can be seen in FIG. 12, the annular damping mass 194 is smaller in size than the annular damping mass 196, and the annular damping mass 196 is smaller in size than the annular damping mass 198. As in the other embodiments, the damping masses 194, 196, 198 are dimensioned so as to define respective shear gaps 205 between the outer periphery of the respective damping masses 194, 196, 198 and the inner wall surface of the respective hollow interior portions in which the damping masses 194, 196, 198 are received.

As further illustrated in FIG. 12, the two smaller damping masses 194, 196 are spaced apart from one another in the axial direction while the largest damping mass 198 is spaced radially outwardly of the two smaller damping masses 194, 196. Also, each of the damping masses, 194, 196, 198 is provided with a respective first annular groove 210, 212, 214 in which are received the respective sets of compensating masses 200, 202, 204. The width and depth of the annular groove 210 in the annular body 194 are smaller than the width and depth dimensions of the annular groove 212 in the damping body 196, and the annular groove 214 in the damping mass 198 possesses a width and depth greater than the width and depth of the annular groove 212 in the damping mass 196.

The compensating masses 200 are arranged in a single annular row in a manner similar to that shown in FIG. 3. Similarly, the compensating masses 202 and the compensating masses 204 are arranged in respective single annular rows. Each of the compensating masses 200 in the smallest annular groove 210 are of the same or substantially the same size and weight, each of the compensating masses 202 in the intermediately sized annular groove 212 are of the same or substantially the same size and weight, and the compensating masses 204 in the largest annular groove 214 are of the same or substantially the same size and weight. Also, the compensating masses 200 in the annular groove 210 of the annular damping mass 194 are smaller in size and weight than the compensating masses 202 in the annular groove 212 of the annular damping mass 196. Additionally, the compensating masses 202 in the annular groove 212 of the damping mass 196 are smaller in size and weight than the compensating masses 204 in the annular groove 214 of the damping mass 198.

Figure 13:
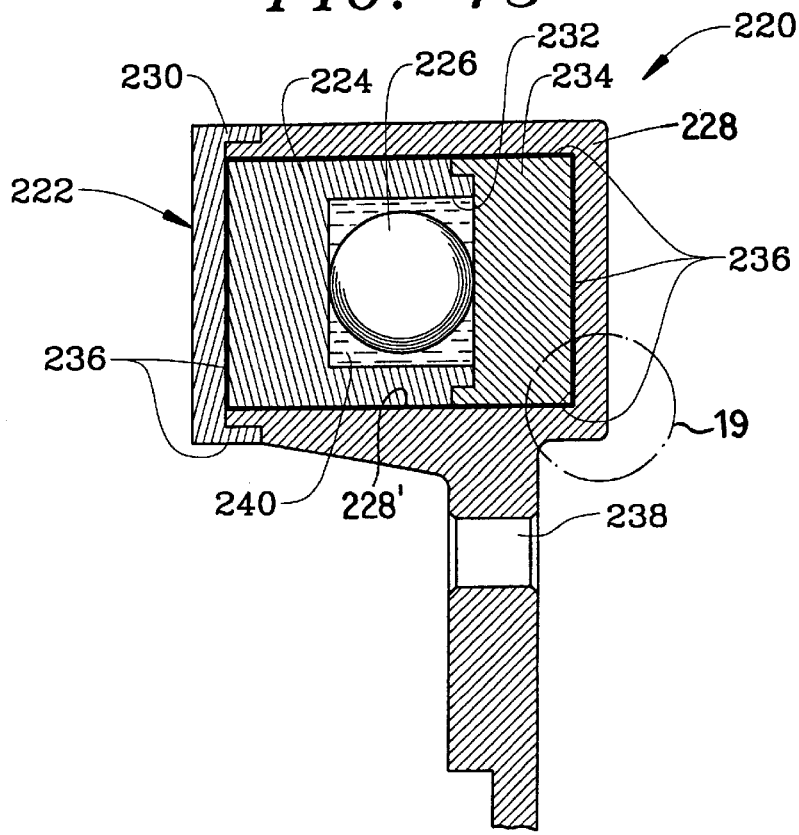
FIG. 13 is a cross-sectional view of a portion of a torsional and translational vibration removing device in accordance with an additional embodiment of the present invention taken along a section line similar to the section line shown in FIG. 4.

FIG. 13 illustrates a further embodiment of the balancer 220 that includes a body 222, an annular torsional vibration damping mass 224, and a set of translational vibration compensating masses 226. The body 222 includes a housing 228 having an annular groove 228' that opens along one side of the housing 228 to permit insertion of the damping mass 224, and a cover 230 covering the open side of the housing 228.

The torsional vibration damping mass 224 is provided with a first annular groove 232 that opens to one side of the damping mass 224 to permit insertion of the plurality of compensating masses 226. The open side of the damping mass 224 is closed by a cover 234. The damping mass 224 is configured to provide shear gaps 236 between the outer peripheral surface of the damping mass 224 and the inner wall surface bounding the hollow interior that receives the damping mass 224.

The plurality of damping masses 226 that are positioned within the annular groove 232 and the damping mass 224 are arranged in a single annular row similar to that shown in FIG. 3. In addition, each of the compensating masses 226 is preferably of the same or substantially the same size and weight. FIG. 13 also depicts the through holes 238 that allow the balancer 220 to be secured to a rotatable element such as a crank shaft or magneto.

Figure 19:
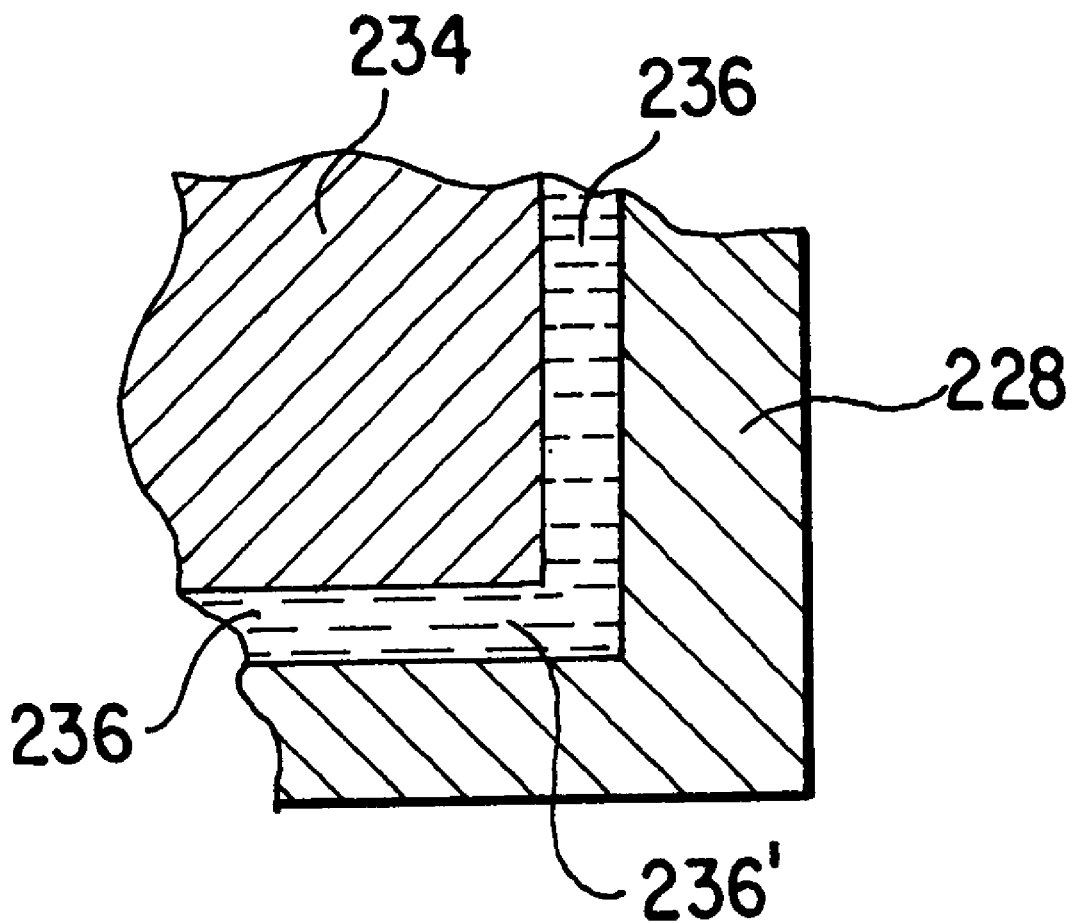
FIG. 19 is an enlarged cross-sectional view of the circled detail identified as 19 in FIG. 13.

The embodiment of the invention shown in FIG. 13 is similar to that described above with respect to the FIG. 9 embodiment in that one type of viscous liquid 236' (see FIG. 19) can be positioned in the shear gaps 236 while a different viscous liquid 240' is positioned in the hollow interior 240 within the annular damping mass 224 to effect quick response of the compensating masses 226 when the balancer 220 initially begins to rotate. The torsional vibration damping mass 224 is free to rotate within the annular groove that is formed in the housing 228 without significant radial movement.

Figure 14:
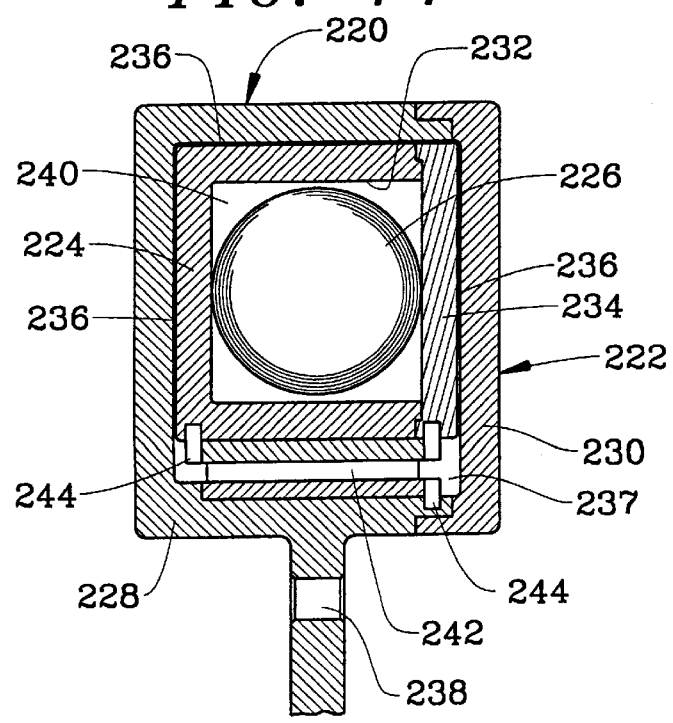
FIG. 14 is a cross-sectional view of a portion of a torsional and translational vibration removing device in accordance with another embodiment of the present invention taken along a section line similar to the section line shown in FIG. 4.

The embodiment of the invention shown in FIG. 14 is similar to that shown in FIG. 13 except that in the embodiment shown in FIG. 14, a needle bearing 242 is positioned between the annular torsional vibration damping mass 224 and one of the inner wall surfaces bounding the hollow interior in the housing 228. The needle bearing 242 is secured in position with, for example, snap rings 244 along the inner shear gap 237. The embodiment of the balancer 220 illustrated in FIG. 14 is advantageous when the radial position of the torsional vibration damping mass 224 must be maintained with a relatively high degree of accuracy, or when excessive forces and friction are expected between the housing 228 and the annular damping mass 224 at the inner shear gap 237.

Figure 15:
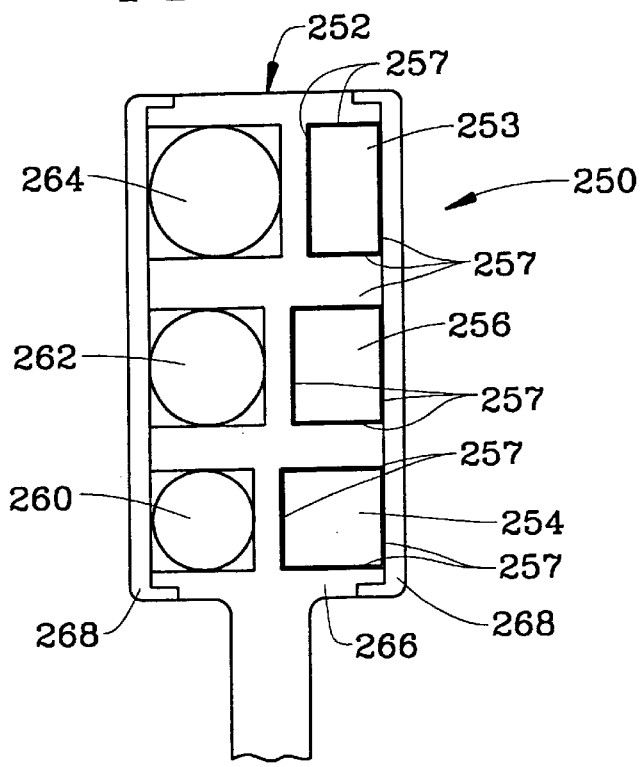
FIG. 15 is a cross-sectional view of a portion of a torsional and translational vibration removing device in accordance with a still further embodiment of the present invention taken along a section line similar to the section line shown in FIG. 4.

FIG. 15 illustrates a different embodiment of the present invention in which the torsional vibration damping masses and the translational vibration compensating masses are separately located within separate grooves in the housing. As illustrated in FIG. 15, the balancer 250 includes a body 252, three annular torsional vibration damping masses 254, 256, 258 and three sets of translational vibration compensating masses 260, 262, 264. The body 252 consists of a housing 266 provided with six annular grooves, three of which open to one side of the housing 266 and three of which open to the opposite side of the housing 266. Covers 268 are secured to the opposite sides of the housing 266 to close the annular grooves and define a plurality of hollow interior portions within the body 252.

The damping masses 254, 256, 258 are positioned on one side of the central plane of the balancer 250 while the sets of compensating masses 260, 262, 264 are positioned on the opposite side of the central plane of the balancer. Each set of compensating masses 260 is positioned in opposing relation to one of the annular damping masses 254, 256, 258. The axial dimension of the damping masses 254, 256, 258 progressively decreases from the radially innermost damping mass 254 to the radially outermost damping mass 258.

Each set of compensating masses 260, 262, 264 is arranged in a single annular row similar to that shown in FIG. 3. As in the other described embodiments, all of the compensating masses 260 are identical or substantially identical in size and weight, all of the compensating masses 262 are identical or substantially identical in size and weight, and all of the compensating masses 264 are identical or substantially identical in size and weight. In addition, the radially innermost set of compensating masses 260 are smaller in size and weight than the radially intermediate set of compensating masses 262, while the size and weight of the radially intermediate set of compensating masses 262 is smaller than the size and weight of the radially outermost set of compensating masses 264.

The annular torsional vibration damping masses 254, 256, 258 are dimensioned to provide shear gaps 257 between the outer peripheral surface of the respective damping mass 254, 256, 258 and the inner wall surface of the respective hollow interior portion in which the damping mass is received. Also, a viscous liquid is disposed in each of the shear gaps 257, an illustration of the viscous liquid being similar to that shown in FIG. 3. A light lubricating and damping fluid is also preferably provided in each of the annular grooves in which the compensating masses 260, 262, 264 are disposed an illustration of the fluid being similar to that shown in FIG. 2. The viscous liquid which fills the annular grooves in which the compensating masses, 260, 262, 264 are disposed is preferably different from the viscous liquid that is disposed in the shear gaps 257 and is preferably selected to achieve good speed of response for the compensating masses 260, 262, 264 when the balancer begins to rotate. It is also possible to employ liquids having different viscosity in each of the annular grooves that contain the compensating masses 260, 262, 264 to effect a different desired degree of response speed for each set of compensating masses. Also, it is possible to employ different liquids or liquids of different viscosities in each of the shear gaps for the damping masses 254, 256, 258.

Figure 16:
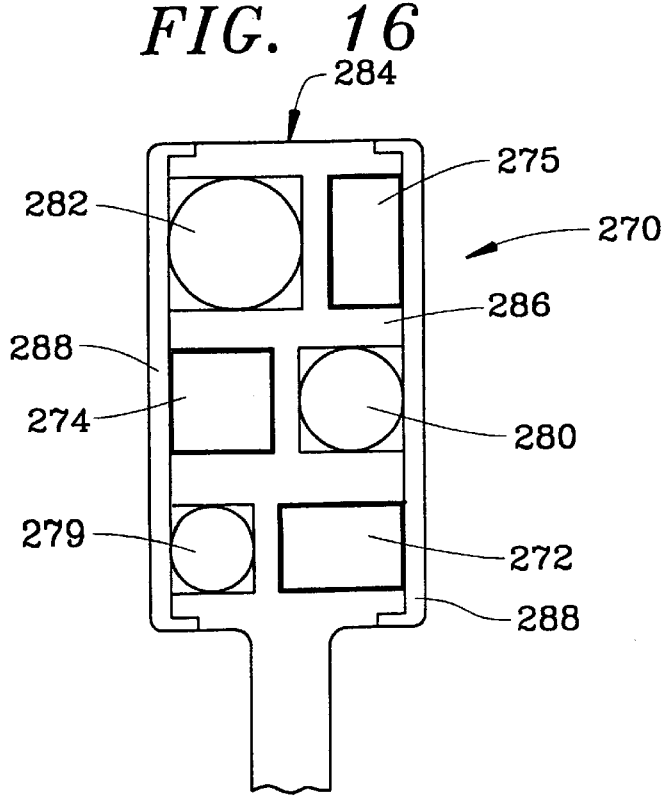
FIG. 16 is a cross-sectional view of a portion of a torsional and translational vibration removing device in accordance with another embodiment of the present invention taken along a section line similar to the section line shown in FIG. 4.
Figure 17:
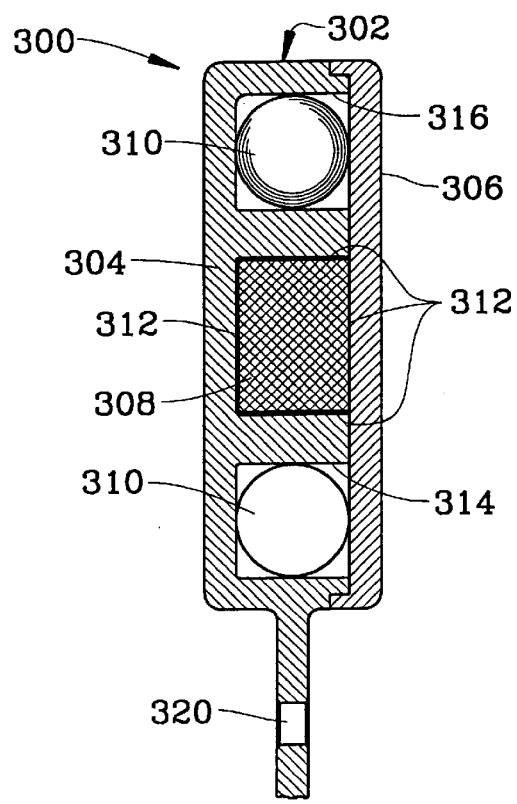
FIG. 17 is a cross-sectional view of a portion of a torsional and translational vibration removing device in accordance with another embodiment of the present invention taken along a section line similar to the section line shown in FIG. 4.

FIG. 16 illustrates an embodiment of a balancer 270 similar to that illustrated in FIG. 15, except that the damping masses 272, 274, 276 and the compensating masses 278, 280, 282 are positioned in staggered relationship on either side of the central plane of the balancer. As in the embodiment shown in FIG. 15, the balancer 270 is defined by a body 284 that consists of a housing 286 provided with three annular grooves that open to one side of the housing 286 and three annular grooves that open to the opposite side of the housing 286. Several covers 288 secured to opposite sides of the housing 286 to close the open grooves and retain the damping masses and compensating masses within the respective hollow interior portions of the body 252. As in the embodiment shown in FIG. 15, the sets of compensating weights 278, 280, 282 progressively increase in size and weight from the radially innermost set of compensating weights 278 to the radially outermost set of compensating weights 282. A still further embodiment of a balancer 300 is illustrated in FIG. 17 and includes a body 302, a torsional vibration damping mass 308 and two sets of translational vibration compensating masses 310 positioned radially inwardly and radially outwardly of the torsional vibration damping mass 308. The body 302 includes a housing 304 provided with three annular grooves positioned coplanar with respect to one another. The annular grooves in the housing 304 open to one side of the housing 304, and a cover is secured to the open side of the housing 304 to close the annular grooves and define three hollow interior portions within the body 302.

The annular torsional vibration damping mass 308 is dimensioned to provide shear gaps 312 between the outer periphery of the damping mass 308 and the inner wall surface bounding the hollow interior portion in which the damping mass 308 is located. A viscous liquid is placed in the shear gap 312.

The radially innermost annular groove 314 and the radially outermost annular groove 316 each receive one of the sets of compensating masses 310. Each of the sets of compensating masses 310 is arranged in a single annular row similar to that shown in FIG. 3. The masses 310 positioned in each respective groove 314, 316, are identical or substantially identical in size and weight to one another. Additionally, the set of compensating masses 310 in the radially outermost groove 316 are identical or substantially identical in size and weight to the size and weight of the compensating masses 310 in the radially innermost annular groove 314. FIG. 17 also illustrates one of a plurality of through holes 320 that facilitate the securement of the balancer 300 to a rotating member such as a rotating shaft.

The various embodiments of the torsional and translational vibration removing device described above and illustrated in the drawing figures are useful in various contexts depending upon the requirements of a particular system. For example, the embodiment of the invention illustrated in FIGS. 2 and 3 provides perhaps the most compact design and so can be used in a wide variety of applications where space limitations and constraints exist. The embodiment shown in FIG. 7 provides additional compensating capacity for translational vibrations by virtue of the two separate sets of translational vibration compensating masses.

The embodiment of the invention shown in FIG. 9 is particularly useful when the translational balancing requirements of a particular application are relatively high. In this regard, the FIG. 9 arrangement provides a series of different races or pathways spaced at varying radial distances from the rotational axis. The embodiment depicted in FIG. 8 provides advantages similar to those associated with the FIG. 9 arrangement, but provides an alternative arrangement for situations in which the machine geometry does not permit coplanar radial arrangement of the various races.

The embodiment of the invention shown in FIG. 10 provides advantages similar to those associated with the FIG. 7 embodiment except that it provides the additional benefit of allowing two different fluids (i.e., fluids of different viscosities) to be used in each of the raceways and in the shear gaps. That is, the shear gaps and the annular grooves in the damping mass on one side of the central wall portion 157 can be filled or partially filled with one type of fluid or a fluid having a particular viscosity, while the shear gaps and the annular grooves in the damping mass on the other side of the central wall portion 157 can be filled or partially filled with a different type of fluid or a fluid having a different viscosity. The arrangement shown in FIG. 10 may be useful if the stability of the system during run-up to the operating speed is of concern.

The embodiment of the invention shown in FIG. 11 may be particularly useful in situations where precision compensation for both torsional and translational vibration is required in the form of a compact and relatively lightweight device. The provision of a plurality of damping masses located at different radial distances from the rotational axis provides the possibility of better "tuning" the device to torsional harmonics that may be present in the particular system. This arrangement can thus significantly improve the quality of balancing, the speed of response and the operational stability of the device.

The arrangement shown in FIG. 12 provides an alternative that combines the advantages associated with the arrangements shown in FIGS. 10 and 11. The embodiment shown in FIG. 13 provides the advantage of utilizing one type of fluid or a fluid having a particular viscosity in the shear gaps while utilizing a different fluid or a fluid having a different viscosity in the race in which the compensating masses move. Thus, silicon oil which has good torsional damping characteristics but poor lubricating characteristics can be used in the shear gaps while a light synthetic oil having good lubrication qualities can be used in the race for effecting a fast response time of the compensating masses. In addition, the use of a heavier fluid in the shear gaps makes it possible to increase the size of the shear gaps and thus minimize the affect of manufacturing tolerances on the performance of the balancer.

The embodiment shown in FIG. 14 provides advantages similar to those associated with the embodiment illustrated in FIG. 13, but provides the additional advantage of providing a relatively precise centering of the damping mass. The arrangement shown in FIG. 14 is also useful when the expected loads between the damping mass and the housing may be relatively high so as to necessitate the needle bearing.

The embodiments of the invention shown in FIGS. 15 and 16 provide advantages similar to those discussed above in connection with the arrangements depicted in FIGS. 11, 12 and 13 except that the compensating masses are separate from the damping masses and so different fluids or fluids of different viscosities can be employed in each of the grooves or pathways.

In the various embodiments of the invention described above, the balancer functions as an untuned damper in a torsional sense which is not tuned for any particular frequency, but is nevertheless well suited for compensating for vibrations over a wide range of frequencies. In some applications where the particular characteristics of the system raise a concern with respect to vibrations having a particular frequency or lying in a frequency range, a tuned mass damper/untuned viscous damper such as that shown in FIG. 18 can be employed. The balancer or damper 320 shown in FIG. 18 includes a body 322 that is comprised of a housing 324 in which is formed an annular groove that opens to one side of the housing 324. A cover 326 is fitted to the open end of the housing 324 to close the open end of the housing and define a hollow interior in the housing.

An annular torsional vibration damping mass 328 is positioned within the hollow interior of the body 322. The annular damping mass 328 possesses a U-shaped cross section and is provided with a groove 330. Positioned within the annular groove 330 are a plurality of translational vibration compensating masses 332 that are arranged in a single annular row similar to the single annular row arrangement shown in FIG. 3. The compensating masses 332 positioned in the annular groove 330 preferably possess the same weight and size as one another.

Two annular disk-like elastomer elements 334 are also positioned within the hollow interior of the body 322 and are disposed on opposite sides of the annular damping mass 328. The elastomer elements 334 are secured to both the annular damping mass 328 as well as the interior walls of the body 322 to thereby limit the angular movement of the annular damping mass 328 during rotation of the balancer 320.

Figure 18:
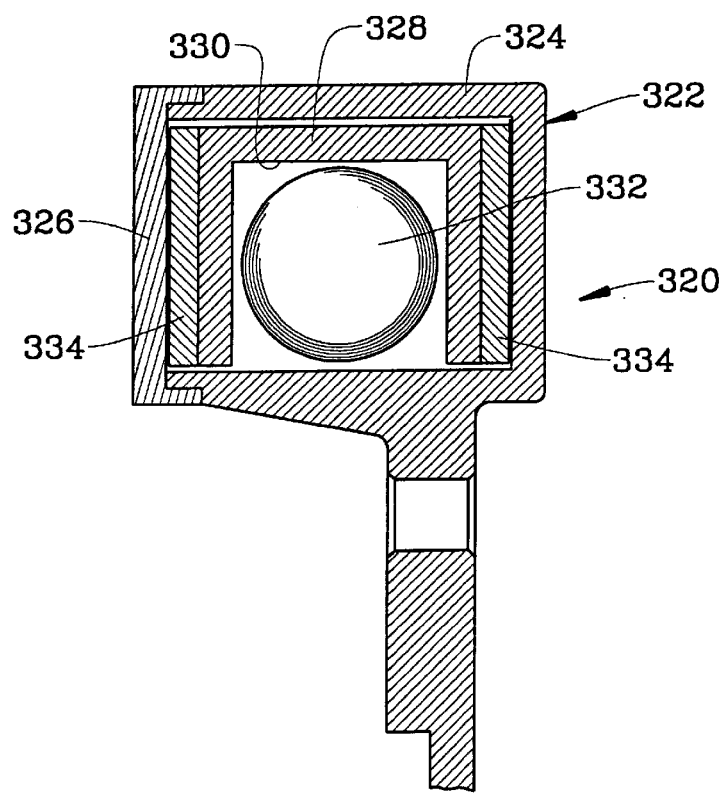
FIG. 18 is a cross-sectional view of a portion of a torsional and translational vibration removing device in accordance with another embodiment of the present invention taken along a section line similar to the section line shown in FIG. 4.

The balancer 320 shown in FIG. 18 can be tuned to dampen a particular torsional vibrational frequency or range of torsional vibrational frequencies by appropriately selecting the material and characteristics of the elastomer elements 334. That is, the natural frequency of the tuned damper is equal to the square root of the rotary stiffness of the elastomer elements 334 divided by the inertia of the damping mass 328. By appropriately selecting the material and characteristics of the elastomer elements 334, the natural frequency of the tuned damper can then be designed to correspond to the torsional vibrational frequency or torsional vibrational frequency range that is of particular concern.

It is to be understood that in the context of each of the above-described embodiments, the balancers are provided with through holes similar to the through holes 52, 54 illustrated in FIGS. 2 and 3 for mounting and securing the balancer in place on the rotating element (e.g., shaft, magneto or other rotatable body). Also, in each of the disclosed embodiments, the compensating masses can be in the form of spherical balls or can take other forms such as cylindrical weights or disk-weights.

The present invention provides a variety of different embodiments for effecting the removal or substantial elimination of torsional vibration as well as translational vibration. In preliminary tests, it has been found that the balancer according to the present invention significantly reduces vibration. Depending upon the context in which the balancer is used, the advantages resulting from the use of the balancer can be realized in several different forms. The use of the balancer in the context of jet skis, for example, allows the rider to operate the jet ski for a much greater period of time without experiencing the continual vibration normally associated with such vessels. In this context as well as others, the reduction in torsional and translational vibration is also advantageous from the standpoint of improving the operation and efficiency of the rotating element and thus the system as a hole. This in turn tends to increase the life of the machinery or system.

The various embodiments of the balancer according to the present invention are also quite advantageous in that they are relatively small and compact in size. This means that the balancer can be used in conjunction with existing systems and machinery.

The ability of the balancer according to the present invention to reduce torsional vibration in addition to translational vibration means that torsional vibrations have a much smaller influence on the behavior of the translational vibration compensating masses than would otherwise be the case if the torsional vibration damping masses were not present. The torsional vibration damping masses exhibit a greatly reduced level of translational vibration than would otherwise be the case if the translational vibration compensating masses were not present.

Although the various embodiments of the balancer described above and illustrated in the drawing figures are intended to be a separate balancer that is attached to the rotating element, it is to be understood that the present invention can be embodied in other forms. For example, if space permits on the rotating element, it may be possible to form annular grooves directly in the rotating element, with such grooves receiving the damping masses and compensating masses in accordance with the various embodiments illustrated in the drawing figures.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A torsional and translational vibration removing device for removing both torsional vibration and translational vibration in a rotatable element, comprising:

a housing provided with an annular groove that is open along at least one side;

a cover secured to the housing to close the one side and define an annular hollow interior that is sealed from outside the hollow interior, the hollow interior being bounded by an inner wall surface;

means for mounting the housing on the rotatable element;

an annular torsional vibration damping mass positioned within the hollow interior and rotating inside the hollow interior with respect to the housing during rotation of the torsional and translational vibration removing device, said torsional vibration damping mass having an outer peripheral surface that is dimensioned smaller than the inner wall surface bounding the hollow interior so that a shear gap exists between the outer peripheral surface of the torsional vibration damping mass and the inner wall surface bounding the hollow interior, said torsional vibration damping mass being provided with one first annular groove;

a viscous fluid disposed in the hollow interior;

a plurality of translational vibration compensating masses positioned within said one first annular groove of the torsional vibration damping mass, said translational vibration compensating masses being positioned within said one first annular groove so as to move within the one first annular groove of the torsional vibration damping mass during rotation of the torsional and translational vibration removing device to assume a position which reduces translational vibration in the rotatable element while the torsional vibration damping mass rotates in the hollow interior to reduce torsional vibration.

2. A torsional and translational vibration removing device as recited in claim 1, including one second annular groove provided in said torsional vibration damping mass, said one second annular groove being spaced apart from the one first annular groove by a wall portion of the torsional vibration damping mass, and including a plurality of translational vibration compensating masses positioned in the one second annular groove of the torsional vibration damping mass so as to move within the one second annular groove during rotation of the torsional and translational vibration removing device.

3. A torsional and translational vibration removing device as recited in claim 2, wherein said first and second annular grooves are equidistantly spaced from a central plane of the housing.

4. A torsional and translational vibration removing device as recited in claim 2, wherein said second annular groove is located radially outwardly of the first annular groove.

5. A torsional and translational vibration removing device as recited in claim 2, wherein said plurality of translational vibration compensating masses in the first annular groove are substantially identical in weight and wherein the translational vibration compensating masses in the second annular groove are substantially identical in weight, the plurality of translational vibration compensating masses in the first annular groove having a weight that is different from the weight of the plurality of translational vibration compensating masses in the second annular groove.

6. A torsional and translational vibration removing device as recited in claim 1, wherein the hollow interior is divided into first and second hollow interior portions that are separated from one another, and wherein said torsional vibration damping mass is a first torsional vibration damping mass disposed in the first hollow interior portion, and including a second annular torsional vibration damping mass positioned within the second hollow interior portion.

7. A torsional and translational vibration removing device as recited in claim 6, wherein said second torsional vibration damping mass is provided with an annular groove, and including a plurality of translational vibration compensating masses disposed in the annular groove of the second torsional vibration damping mass.

8. A torsional and translational vibration removing device as recited in claim 1, wherein said torsional vibration damping mass is provided with first, second and third annular grooves that are arranged adjacent to one another in a direction parallel to a rotational axis of the housing, said plurality of translational vibration compensating masses being disposed in the first annular groove of the torsional vibration damping mass, and including a plurality of translational vibration compensating masses disposed in the second annular groove, and a plurality of translational vibration compensating masses disposed in the third annular groove.

9. A torsional and translational vibration removing device as recited in claim 8, wherein the plurality of translational vibration compensating masses in the first annular groove each possess a weight that is different from the weight of each of the translational vibration compensating masses in the second annular groove and the third annular groove.

10. A torsional and translational vibration removing device as recited in claim 1, wherein said plurality of translational vibration compensating masses are arranged in a single annular row within said one first annular groove of the torsional vibration damping mass.

11. A torsional and translational vibration removing device for removing torsional vibration and translational vibration in a rotatable element, comprising:

a body having a hollow interior;

an annular torsional vibration damping mass positioned within the hollow interior of the body and rotating with respect to the body within the hollow interior of the body during rotation of the torsional and translational vibration removing device, said torsional vibration damping mass being provided with one first annular groove;

a viscous liquid in the hollow interior of the body;

a plurality of translational vibration compensating masses disposed in the one first annular groove of the torsional vibration damping mass, said plurality of translational vibration compensation masses being arranged in a single annular row within said one first annular groove, said plurality of translational vibration compensating masses being positioned within the one first annular groove so as to move in the one first annular groove of the torsional vibration damping mass during rotation of the body to assume a position which reduces translational vibration while the torsional vibration damping mass rotates in the hollow interior to reduce torsional vibration.

12. A torsional and translational vibration removing device as set forth in claim 11, wherein the body is adapted to be mounted on the rotatable element.

13. A torsional and translational vibration removing device as set forth in claim 11, including means for mounting the body on the rotatable element.

14. A torsional and translational vibration removing device as set forth in claim 11, including one second annular groove provided in said torsional vibration damping mass, said one second annular groove being spaced apart from the one first annular groove by a wall portion of the torsional vibration damping mass, and including a plurality of translational vibration compensating masses positioned in the one second annular groove of the torsional vibration damping mass so as to move in the one second annular groove during rotation of the torsional and translational vibration removing device.

15. A torsional and translational vibration removing device as set forth in claim 14, wherein said second annular groove is located radially outwardly of the first annular groove.

16. A torsional and translational vibration removing device as set forth in claim 14, wherein said plurality of translational vibration compensating masses in the first annular groove are substantially identical in weight and wherein the translational vibration compensating masses in the second annular groove are substantially identical in weight, the plurality of translational vibration compensating masses in the first annular groove having a weight that is different from the weight of the plurality of translational vibration compensating masses in the second annular groove.

17. A torsional and translational vibration removing device as set forth in claim 11, wherein the hollow interior is divided into first and second hollow interior portions that are separated from one another, and wherein said torsional vibration damping mass is a first torsional vibration damping mass disposed in the first hollow interior portion, and including a second annular torsional vibration damping mass positioned within the second hollow interior portion.

18. A torsional and translational vibration removing device as set forth in claim 17, wherein said second torsional vibration damping mass is provided with an annular groove, and including a plurality of translational vibration compensating masses disposed in the annular groove of the second torsional vibration damping mass.

19. A torsional and translational vibration removing device as set forth in claim 11, wherein said torsional vibration damping mass is provided with one second annular groove and one third annular groove that are arranged adjacent to one another in a direction parallel to a rotational axis of the housing, and including a plurality of translational vibration compensating masses disposed in the one second annular groove and a plurality of translational vibration compensating masses disposed in the one third annular groove.

20. A torsional and translational vibration removing device as set forth in claim 11, including a pair of separate elastomer elements positioned within the hollow interior, the elastomer elements being secured to the annular torsional vibration compensating mass and being secured to an inner wall surface bounding the hollow interior.

* * * * *